(12) United States Patent
Marroquin

(10) Patent No.: US 7,857,479 B1
(45) Date of Patent: Dec. 28, 2010

(54) LIGHTED HELMET APPARATUS

(76) Inventor: Carlos R. Marroquin, 4150 E. Main St., Apartment #1013, Mesa, AZ (US) 85205

( * ) Notice: Subject to any disclaimer, the term of this patent is extended or adjusted under 35 U.S.C. 154(b) by 0 days.

(21) Appl. No.: 12/843,136

(22) Filed: Jul. 26, 2010

(51) Int. Cl.
*F21V 21/084* (2006.01)

(52) U.S. Cl. .................. 362/105; 340/479; 455/41.2

(58) Field of Classification Search ........... 455/41.2; 362/105
See application file for complete search history.

(56) References Cited

U.S. PATENT DOCUMENTS

| | | | | |
|---|---|---|---|---|
| 4,559,516 | A | * | 12/1985 | Schott et al. ............... 340/475 |
| 4,891,736 | A | * | 1/1990 | Gouda ........................ 362/105 |
| 6,157,298 | A | * | 12/2000 | Garfinkel et al. ............ 340/479 |
| 6,406,168 | B1 | * | 6/2002 | Whiting ...................... 362/473 |
| 6,784,795 | B1 | | 8/2004 | Pories et al. |
| 7,109,857 | B2 | | 9/2006 | Ross, Jr. et al. |
| 2006/0012471 | A1 | * | 1/2006 | Ross et al. .................. 340/479 |
| 2009/0158508 | A1 | * | 6/2009 | Quaranta et al. ............. 2/421 |

\* cited by examiner

*Primary Examiner*—Matthew D Anderson
*Assistant Examiner*—David Bilodeau
(74) *Attorney, Agent, or Firm*—Crossley Patent Law; Mark A. Crossley

(57) ABSTRACT

The lighted helmet apparatus provides several features that aid both the wearer and those behind the wearer. The turn signals of the helmet are importantly arrow-shaped to be easily identified by following traffic, and appropriately located on left and right sides of the helmet. The running lights of the helmet importantly provide the elevated identification of operation to following motorists. The brake lights of the helmet importantly provide easily and centrally recognized braking of the wearer. The helmet wearer is reminded of turn signal functions by the front mounted signal reminders so that turn signals are not inadvertently left on, which is often the case in motorcycle and other such vehicular operation. Flush mounting of the individual lights within the helmet are an especially attractive feature and also one that prevents damage to the lights. The Bluetooth™ inclusion in the apparatus is a further advantage.

1 Claim, 6 Drawing Sheets

LIGHTED HELMET APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Like automobile rear lights, it is now understood that helmet lights, such as those used on motorcycles for example, can be advantageous in safe operation of such vehicles. This is especially true due to the increased risk present in motorcycle riding. These considerations have been previously addressed by various inventions attempting to at least partially alleviate risks. The present apparatus provides advantages heretofore lacking in a lighted motorcycle helmet that is in Bluetooth™ communication with a motorcycle's functions.

FIELD OF THE INVENTION

The lighted helmet apparatus relates to helmets worn in the operation of motor vehicles such as motorcycles, ATV's, and the like and especially to a helmet with built-in highly identifiable lighting that signals both a wearer and following traffic of motorcycle functions and rider intentions.

SUMMARY OF THE INVENTION

The general purpose of the lighted helmet apparatus, described subsequently in greater detail, is to provide a lighted helmet apparatus which has many novel features that result in an improved lighted helmet apparatus which is not anticipated, rendered obvious, suggested, or even implied by prior art, either alone or in combination thereof.

To attain this, the lighted helmet apparatus provides several features that aid both the wearer and those behind the wearer. The turn signals of the helmet are importantly arrow-shaped to be easily identified by following traffic, and appropriately located on left and right sides of the helmet. The running lights of the helmet importantly provide the elevated identification of operation to following motorists. The brake lights of the helmet importantly provide easily and centrally recognized braking of the wearer. Of further importance is that the helmet wearer is reminded of turn signal functions by the front mounted signal reminders so that turn signals are not inadvertently left on, which is often the case in motorcycle and other such vehicular operation.

Flush mounting of the individual lights within the helmet are an especially attractive feature and also one that prevents damage to the lights. The Bluetooth™ inclusion in the apparatus is a further advantage.

Thus has been broadly outlined the more important features of the improved lighted helmet apparatus so that the detailed description thereof that follows may be better understood and in order that the present contribution to the art may be better appreciated.

An object of the lighted helmet apparatus is to increase safety in operation vehicles that involve helmet use.

Another object of the lighted helmet apparatus is to warn following vehicle operators of intended and executed maneuvers.

A further object of the lighted helmet apparatus is to clearly identify to others each of the intended and executed maneuvers.

An added object of the lighted helmet apparatus is to remind the wearer of signaled maneuvers.

And, an object of the lighted helmet apparatus is to be unobtrusively included within the helmet.

Yet another object of the lighted helmet apparatus is to utilize wireless Bluetooth™ technology.

These together with additional objects, features and advantages of the improved lighted helmet apparatus will be readily apparent to those of ordinary skill in the art upon reading the following detailed description of presently preferred, but nonetheless illustrative, embodiments of the improved lighted helmet apparatus when taken in conjunction with the accompanying drawings.

In this respect, before explaining the current embodiments of the improved lighted helmet apparatus in detail, it is to be understood that the lighted helmet apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved lighted helmet apparatus. It is therefore important that the claims be regarded as including such equivalent constructions insofar as they do not depart from the spirit and scope of the lighted helmet apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 6 thereof, the principles and concepts of the lighted helmet apparatus generally designated by the reference number 10 will be described.

Figure 1:
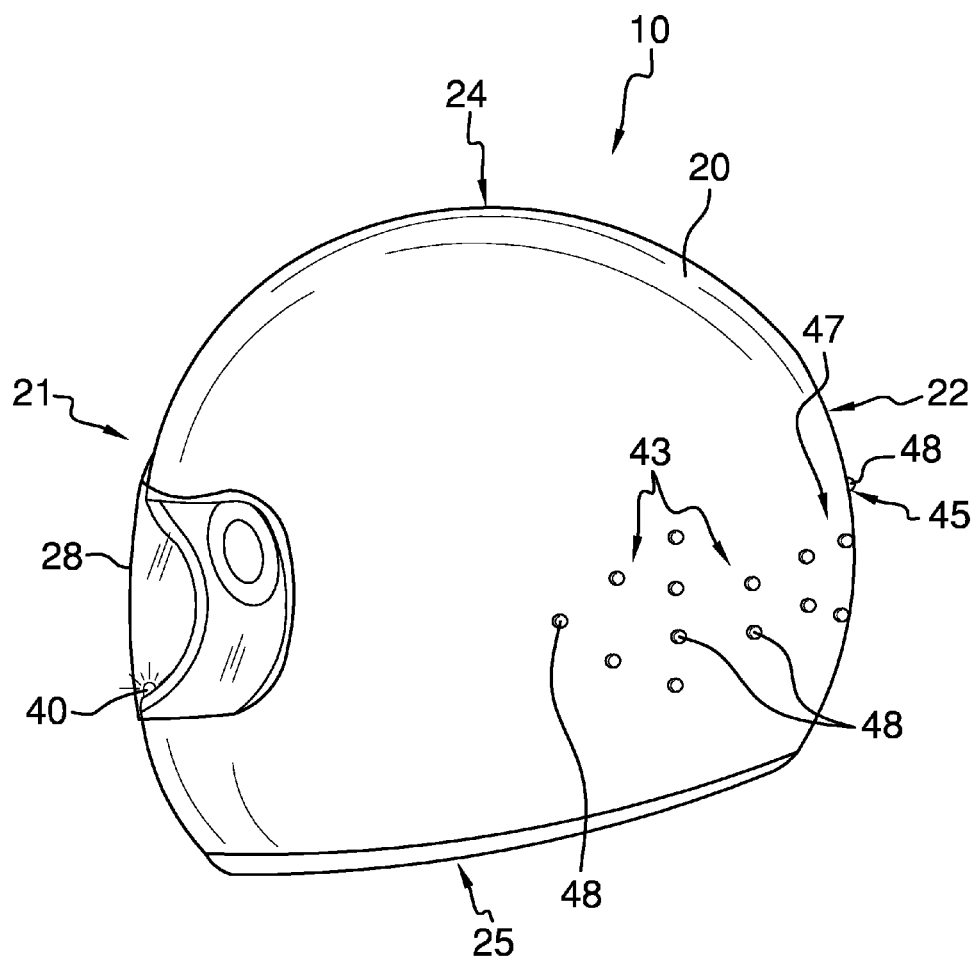
FIG. 1 is a rear biased perspective view of the helmet.

Referring to FIG. 1, the apparatus 10 partially comprises the helmet 20 comprising a top 24 spaced apart from the bottom 25 and a front 21 spaced apart from the rear 22.

Figure 6:
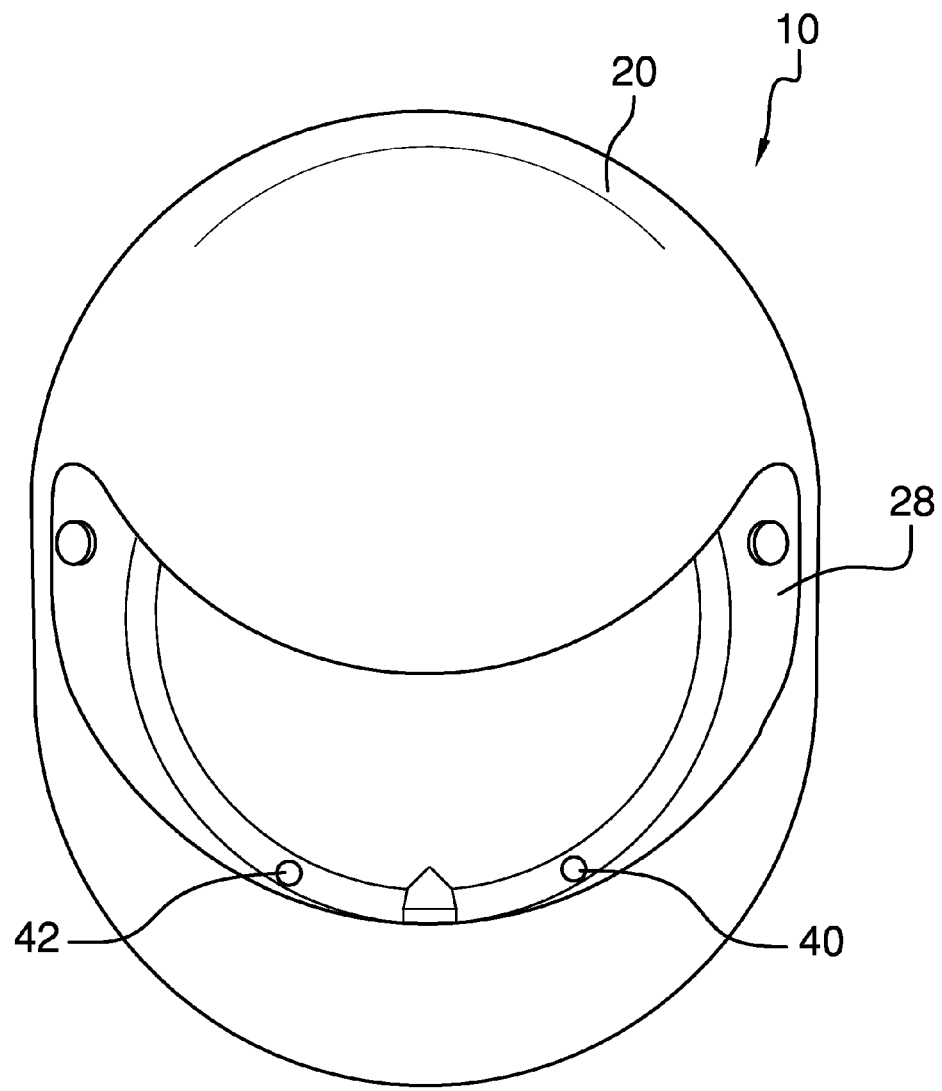
FIG. 6 is a front elevation view of the helmet.

Referring to FIG. 1 and FIG. 6, the hinged visor 28 is disposed on the helmet 20 front 21. The pair of lighted signal reminders is disposed within the helmet 20 front 21 adjacent to the hinged visor 28. The signal reminders comprise the left signal reminder 40 and the right signal reminder 42.

Figure 2:
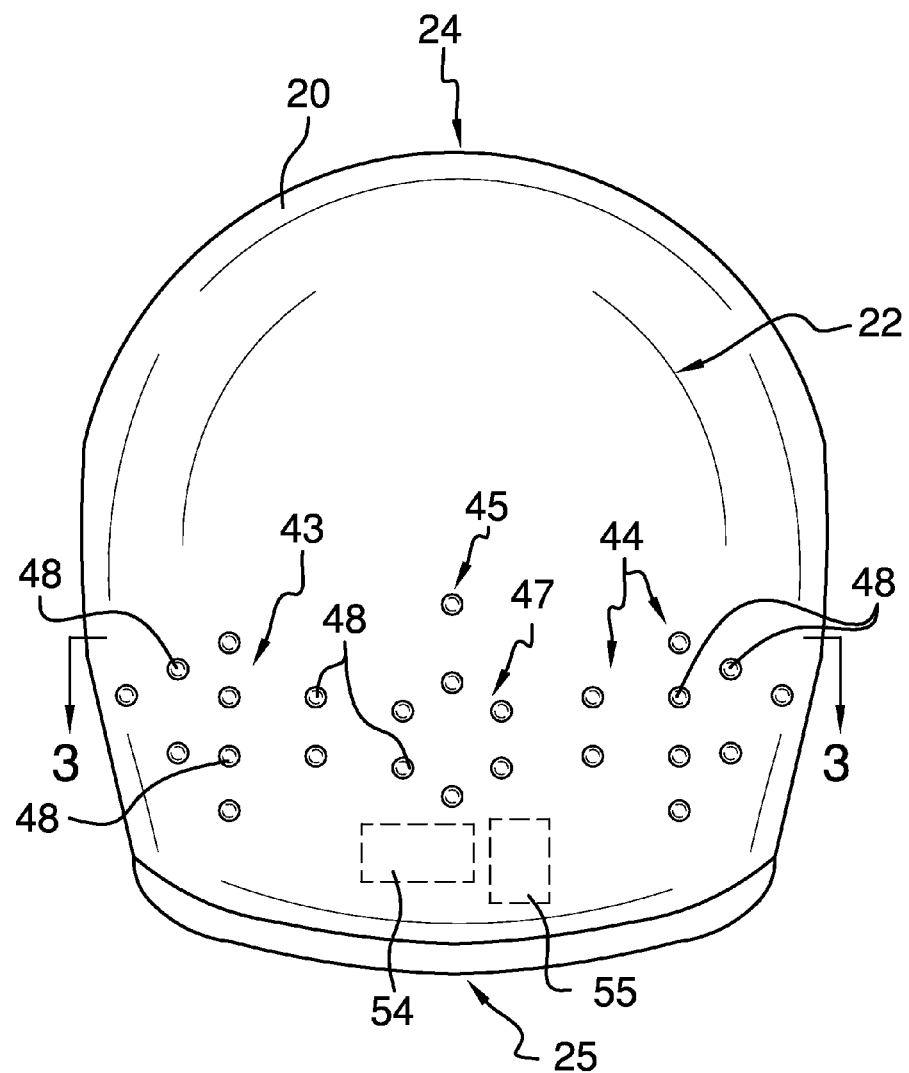
FIG. 2 is a rear elevation view of the helmet.

Referring to FIG. 2, the circle of spaced apart brake lights 47 is disposed in the helmet 20 rear 22 most proximal to the bottom 25. The lights 48 comprising the brake lights 47 are flushly mounted within the helmet 20 and are comprised of individual lights 48. Individual lights 48 also comprise other lighted features in the helmet 20. A plurality of spaced apart flushly mounted lights 48 are disposed in the helmet 20 left rear 22 proximal to and separated from the brake lights 47.

The left rear 22 lights 48 form the left signal 43. Another plurality of spaced apart flushly mounted lights 48 is disposed in the helmet 20 right rear 22 proximal to and separated from the brake lights 47. The right rear 22 lights 48 form the right signal 44. The running light 45 is disposed flushly within the helmet 20 rear 22 above the brake lights 47. Additional running lights 45 may be used.

Figure 3:
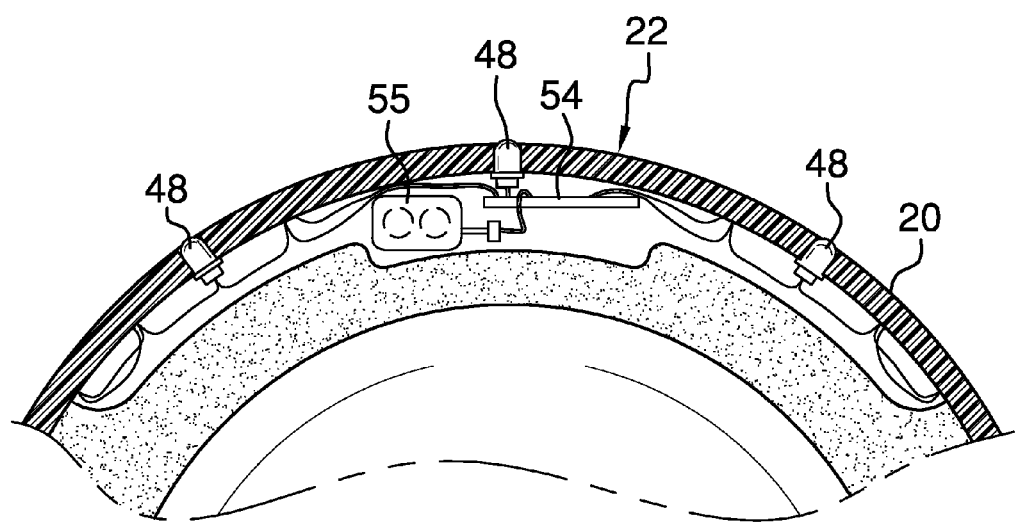
FIG. 3 is a partial cross sectional view of FIG. 2, taken along the line 3-3.

Referring to FIG. 3, the combined receiver/microprocessor 54 is disposed within the helmet 20 rear 22. The receiver/microprocessor 54 is in communication with the signal reminders, the brake lights 47, the running light 45, and the left signal 43 and right signal 44. The power source 55 is disposed within the helmet 20 rear 22. The power source 55 is in communication with the receiver/microprocessor 54.

Figure 5:
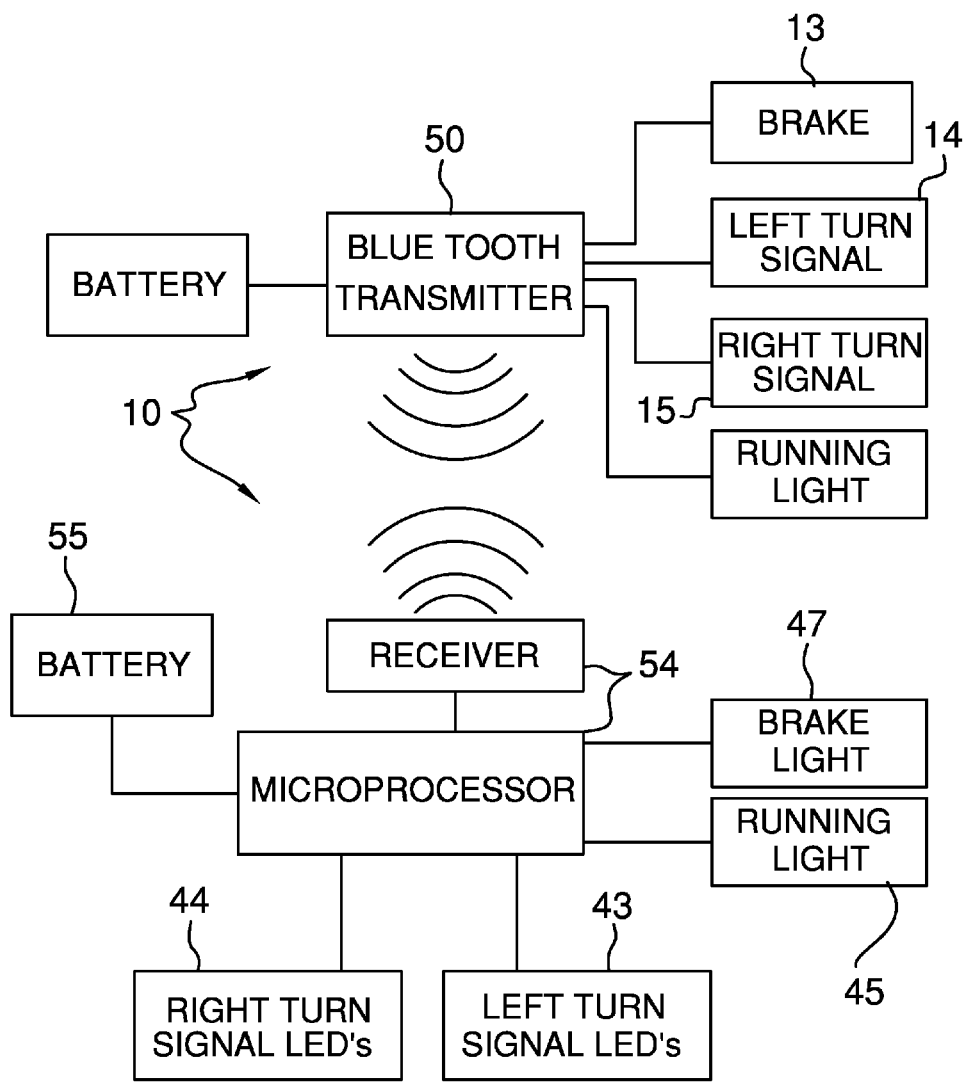
FIG. 5 is a schematic block diagram of the apparatus and related existing components.

Referring to FIG. 5, the Bluetooth™ transmitter 50 is affixed to an existing vehicle such as the motorcycle 12. The transmitter 50 is in communication with an existing battery, brake signal actuator 13, left turn signal actuator 14, right turn signal actuator 15, and running lights of the existing motorcycle 12

Figure 4:
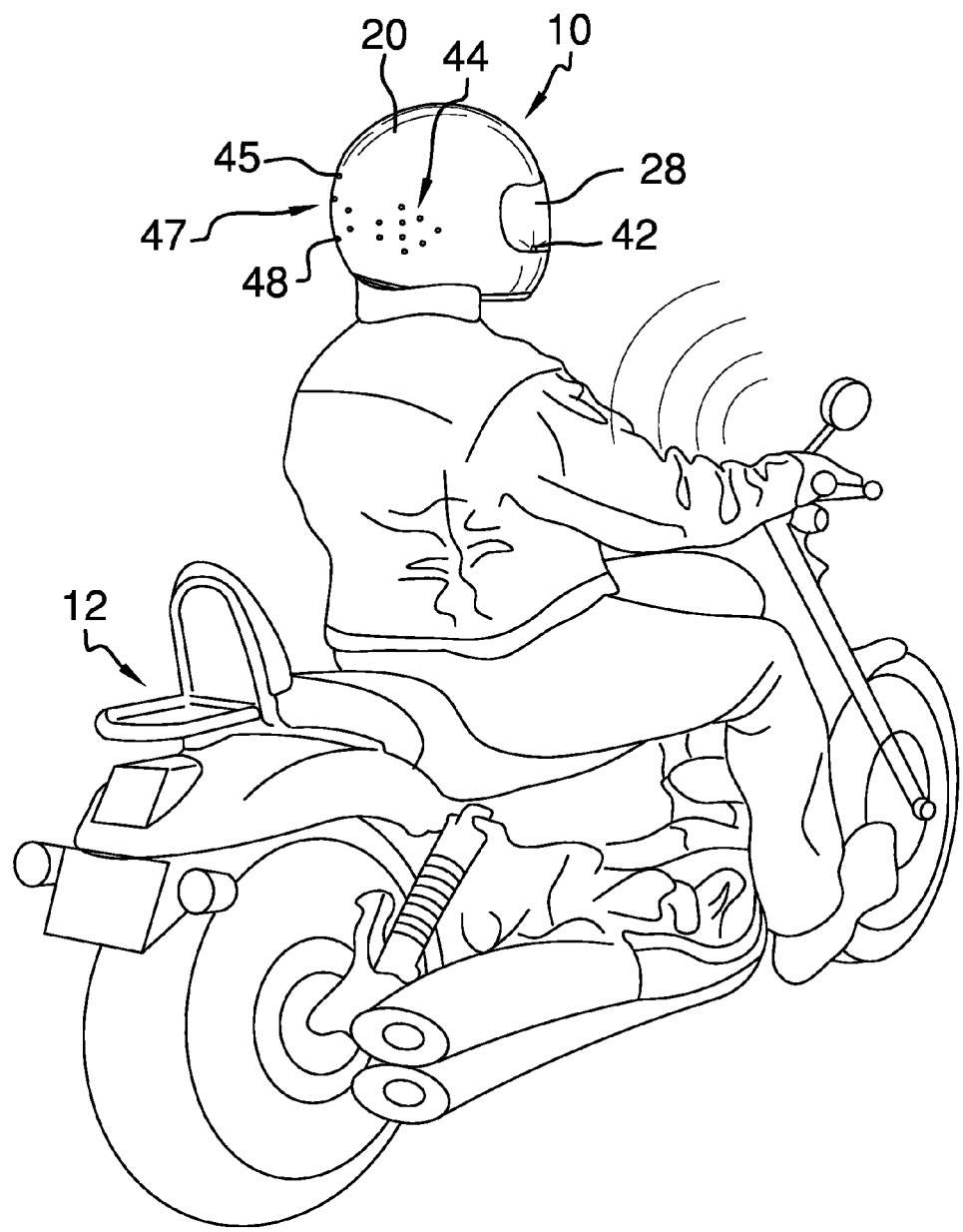
FIG. 4 is a rear perspective view of the apparatus in use.

Referring to FIG. 4 and further to FIG. 5, an exemplary function of the apparatus 10 lights the brake lights 47 of the helmet 20 by the wearer's actuation of the brake of the motorcycle 12. In further function, actuation of the motorcycle 12 brake signal actuator 13, left turn actuator 14, right turn actuator 15, and running lights see the transmitter 50 send to the receiver/microprocessor 54 to light the appropriate corresponding lights 48 of the helmet 20. The front mounted left signal reminder 40 and right signal reminder 42 continue to signal the helmet 20 wearer of lighting of the left signal 43 and right signal 44 in the helmet 20 rear 22 until the corresponding motorcycle 12 functions are discontinued.

With respect to the above description then, it is to be realized that the optimum dimensional relationships for the parts of the lighted helmet apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the lighted helmet apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the lighted helmet apparatus may be used.

Therefore, the foregoing is considered as illustrative only of the principles of the lighted helmet apparatus. Further, since numerous modifications and changes will readily occur to those skilled in the art, it is not desired to limit the lighted helmet apparatus to the exact construction and operation shown and described, and accordingly, all suitable modifications and equivalents may be resorted to, falling within the scope of the lighted helmet apparatus.

What is claimed is:

1. A lighted helmet apparatus comprising, in combination:
   a helmet comprising a top spaced apart from a bottom and a front spaced apart from a rear;
   a hinged visor disposed on the helmet front;
   a pair of lighted signal reminders disposed within the helmet front adjacent to the hinged visor, the signal reminders comprising a left signal reminder and a right signal reminder;
   a circle of spaced apart brake lights disposed in the helmet rear most proximal to the bottom, the brake lights flushly mounted within the helmet;
   a plurality of spaced apart flushly mounted lights disposed in the helmet left rear proximal to and separated from the brake lights, the left rear lights forming a left signal;
   a plurality of spaced apart flushly mounted lights disposed in the helmet right rear proximal to and separated from the brake lights, the right rear lights forming a right signal;
   a running light disposed flushly within the helmet rear above the brake lights;
   a combined receiver/microprocessor disposed within the helmet rear, the microprocessor in communication with the signal reminders, the brake lights, the running light, and the left and right signals;
   a power source disposed within the helmet rear, the power source in communication with the receiver/microprocessor;
   a Bluetooth™ transmitter affixed to an existing vehicle, the transmitter in communication with an existing battery, brake signal actuator, left turn signal actuator, right turn signal actuator, and running lights of the existing vehicle.

* * * * *